United States Patent [19]

Carlini

[11] Patent Number: 5,441,168

[45] Date of Patent: Aug. 15, 1995

[54] PROTECTIVE SEAL RING FOR MOTORCYCLE FUEL FILLER NECK

[76] Inventor: Anthony J. Carlini, 5 Geneve, Newport Beach, Calif. 92660

[21] Appl. No.: 216,183

[22] Filed: Mar. 21, 1994

[51] Int. Cl.6 .............................................. B65D 55/00
[52] U.S. Cl. ..................................... 220/378; 220/465; 220/86.2
[58] Field of Search ............. 220/378, 304, 465, 86.1, 220/86.2, DIG. 33; 277/169, 168

[56] References Cited

U.S. PATENT DOCUMENTS

| | | | |
|---|---|---|---|
| 2,972,431 | 2/1961 | Parish, Jr. et al. | 220/378 X |
| 3,276,617 | 10/1966 | Rempt | 220/304 X |
| 3,334,779 | 8/1967 | Smith | 220/86.2 |
| 4,090,634 | 5/1978 | Tsukisaka et al. | 220/DIG. 33 X |
| 4,795,054 | 1/1989 | Brown | 220/DIG. 33 X |

*Primary Examiner*—Steven M. Pollard
*Attorney, Agent, or Firm*—Roy A. Ekstrand

[57] ABSTRACT

A protective seal ring for motorcycle fuel tank neck defines a generally annular body having a center aperture formed therein. The center aperture is defined by a filler neck extension which is received within the interior of the motorcycle fuel tank filler neck. The seal ring further defines a curved gasket seat and an outwardly extending raised portion together with a downwardly angled portion. An adhesive seal bead is formed upon the undersurface of the filler neck extension and gasket seat of the protective seal ring to secure the seal ring in place upon the motorcycle fuel tank filler neck.

6 Claims, 1 Drawing Sheet

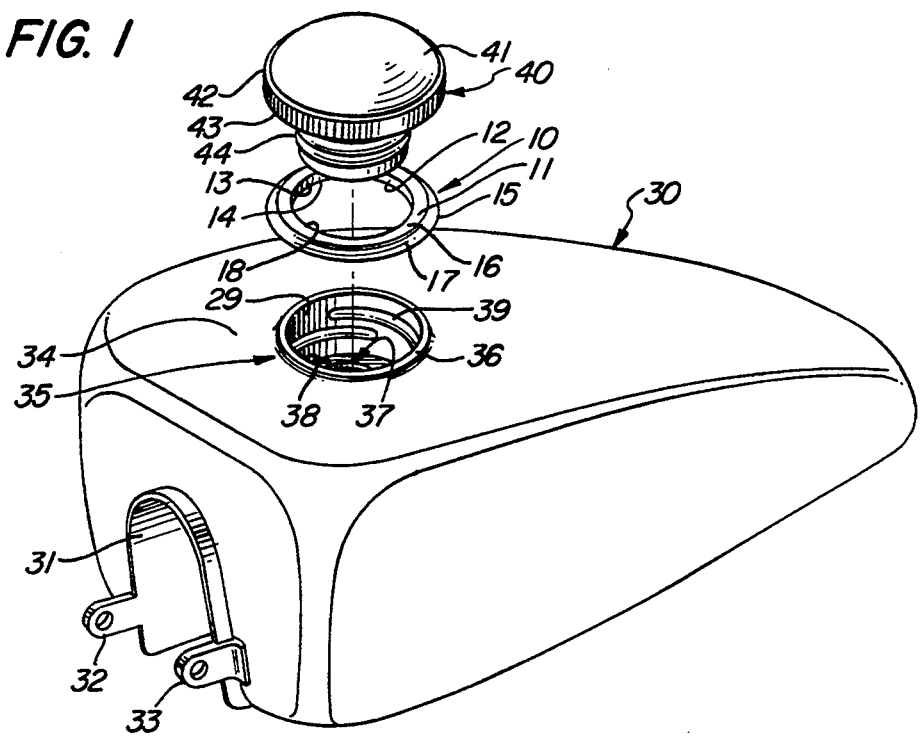
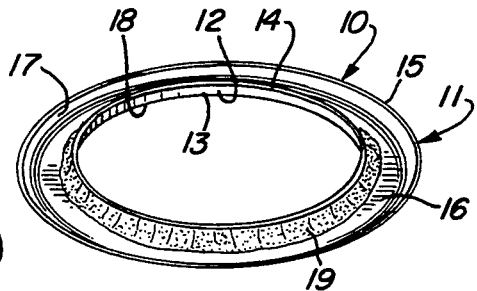
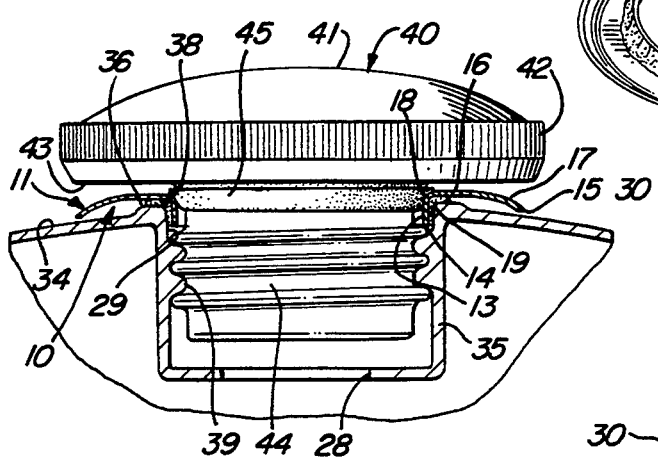
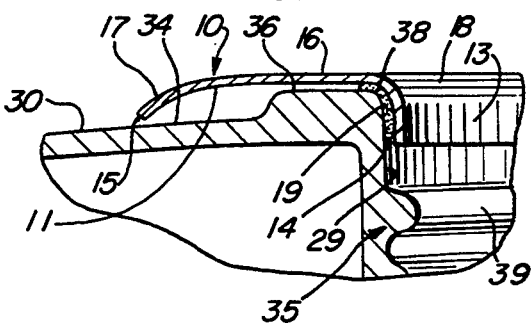

PROTECTIVE SEAL RING FOR MOTORCYCLE FUEL FILLER NECK

FIELD OF THE INVENTION

This invention relates generally to motorcycle fuel systems and particularly to filler neck seal provided therein.

BACKGROUND OF THE INVENTION

Motorcycles have become an extremely popular type of vehicle and have enjoyed widespread use for activities such as sport and recreation as well as general transportation. In addition, certain motorcycles have become the centerpiece of extensive hobby and collector enthusiasts due to the variety of motorcycles manufactured through the years as the technology has developed and improved. In addition, various motorcycles have become the subject of substantial nostalgia and have in some instances come to symbolize certain periods of life or lifestyles to a broad range of individuals. As a result, motorcycles continue to be extremely popular and continue to appeal to an ever broadening consumer base. While the design and appearance of motorcycles have undergone substantial variation and change through the years, all may be generally described as vehicles having a basic frame which supports a rear drive wheel and a pivoting front wheel supported by a pivotable steering assembly having a set of handlebars at the upper portion thereof. A seat is supported upon the frame between the front and rear wheels and suitable supports for the rider's feet are provided at the lower frame. In most motorcycles the engine is positioned generally beneath and usually slightly forward of the seat while the fuel tank is positioned above the engine and extends generally between the seat and the front steering housing.

One of the more popular motorcycles through the years is known as the Harley-Davidson motorcycle manufactured and sold by the Harley-Davidson Motorcycle Company. In many Harley-Davidson motorcycles, the fuel tank is somewhat teardrop shaped defining a larger cross-section at the front portion and tapering to a narrower cross-section at the rear portion. The fuel filler is positioned on the upper surface of the fuel tank and includes a circular aperture having a cylindrical filler neck extending from the upper tank surface into the tank interior. The filler neck defines internal threads within the cylindrical filler neck passage for receiving a gas cap and further defines a raised ring encircling the filler neck aperture and rising slightly above the adjacent tank surface. The gas cap in such motorcycles includes a generally cylindrical externally threaded member having a large circular and often somewhat dome-shaped knob at the top portion thereof. A resilient seal or gasket is supported on the underside of the circular knob at the top of the threaded cylindrical portion. As the knob is threaded into the filler neck, the resilient seal is forced against the raised ring and compresses to provide a sealing closure of the filler neck.

The most common practice in Harley-Davidson motorcycle manufacture and restoration is to paint the fuel tank with a smooth lustrous high gloss paint. The paint applied to the fuel tank extends across and covers the raised ring encircling the filler neck. The presence of this painted surface upon the raised ring causes several problems to arise in the motorcycle during use. For example, the insertion and removal of the service station filler nozzle during refueling often chips and damages the paint upon the raised ring. This provides an uneven surface which reduces the effectiveness of the resilient seal and raises the potential for fuel leakage. In addition, the chipping of the protective paint permits other undesired chemical reactions such as corrosion or rust to take place. In addition to paint chipping due to filler nozzle insertion and removal, the fuel used in such motorcycles is often incompatible with the high luster, high gloss paints used by many enthusiasts. As a result, the paint may blister and flake excessively about the raised fuel ring.

All of these problems combine to create a substantial nuisance in the use of Harley Davidson motorcycles having such filler neck constructions.

There arises therefore a need in the art for appropriate corrective measures and protective apparatus which may be used to overcome these deficiencies in this type of motorcycle fuel tank construction.

SUMMARY OF THE INVENTION

Accordingly, it is a general object of the present invention to provide an improved protective seal for a motorcycle fuel filler neck. It is a more particular object of the present invention to provide an improved protective seal ring for motorcycle fuel filler necks which prevents paint chipping, blistering and flaking due to the fueling process.

In accordance with the present invention, there is provided for use in combination with a motorcycle fuel tank having an upper surface, a filler neck, a raised ring surrounding the filler neck, a gasket seat and a gas cap having a seal gasket receivable into the filler neck, a protective seal ring comprises: an annular body defining a filler neck extension receivable into the motorcycle fuel tank filler neck, a curved gasket seat extending from the filler neck extension and a raised portion extending outwardly from the gasket seat and covering the raised ring of the motorcycle fuel tank; and an adhesive seal bead interposed between the gasket seat of the motorcycle filler neck and the filler neck extension, the annular body being positioned within the motorcycle filler neck by inserting the motorcycle gas cap into the filler neck and forcing the gas cap seal gasket against the curved gasket seat.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective assembly view of a protective seal ring constructed in accordance with the present invention assembled to a conventional motorcycle fuel tank;

FIG. 2 sets forth a perspective inverted view of the present invention protective seal ring;

FIG. 3 sets forth a section view of the present invention protective seal ring installed in a conventional motorcycle fuel filler neck; and FIG. 4 sets forth a partial section view of the seal portion of the present invention protective seal ring installed in a conventional motorcycle fuel filler neck.

DESCRIPTION OF THE PREFERRED EMBODIMENT

FIG. 1 sets forth a perspective assembly view of a protective seal ring for motorcycle fuel filler neck constructed in accordance with the present invention and generally referenced by numeral 10. FIG. 1 shows seal ring 10 in an assembly view in combination with a conventional motorcycle fuel tank 30 having a conventional gas cap 40 securable thereto. Seal ring 10 is preferably formed of a strong rigid corrosion resistant material such as stainless steel or the like and defines a generally annular body 11 having an outer edge 15 and a center aperture 12. Seal ring 10 further defines a generally flat raised portion 16 and a downwardly angled portion 17. Seal ring 10 further includes a downwardly extending generally cylindrical fuel neck extension 13 defining a lower edge 14 and a rounded gasket seat surface 18.

Fuel tank 30 is, as mentioned above, constructed in accordance with conventional fabrication techniques and defines a generally teardrop shape having a frame channel 31 extending through the lower portion thereof. Frame channel 31 provides for assembly of fuel tank 30 to a frame support portion (not shown) of the host motorcycle. A pair of attachment tabs 32 and 33 extend forwardly on either side of frame channel 31 to aid in the attachment of fuel tank 30 of the host motorcycle. Fuel tank 30 further defines an outer surface 34 having a raised ring 36 formed therein. A filler neck 35 includes a generally cylindrical member having an interior wall 29 extending downwardly from raised ring 36 into the interior of fuel tank 30. Interior wall 29 further defines a plurality of internal threads 39. Filler neck 35 further defines a rounded gasket seat 38 extending between raised ring 36 and interior wall 29. Filler neck 35 defines a filler passage 37 providing for the introduction of fuel into fuel tank 30.

Gas cap 40 is, as is also mentioned above, constructed in accordance with conventional fabrication techniques and includes a circular generally domed knob 41 having a generally planar undersurface 43 and an outer grip surface 42. Gas cap 40 further includes a threaded cylindrical portion 44 extending downwardly therefrom. As is better seen in FIG. 3, gas cap 40 further supports an annular resilient seal gasket 45 positioned against undersurface 43 and encircling threaded cylindrical portion 44. While not visible in FIG. 1, it should be understood that in accordance with conventional fabrication techniques, fuel tank 30 and raised ring 36 are covered with a layer of conventional high gloss paint such as automotive enamel or lacquer or its equivalent. This paint layer generally extends downwardly a short distance into filler neck 35 and covers gasket seat 38.

In accordance with the present invention and as is better seen in FIG. 2, seal ring 10 receives and supports an adhesive seal bead 19 on the undersurface thereof generally coextensive with the interior surface of fuel neck extension 13. While a variety of adhesive materials may be utilized for forming adhesive seal bead 19, it has been found particularly advantageous to utilize an epoxy adhesive such as the epoxy adhesive manufactured and sold under the brand name Quick-Steel. It will be apparent to those skilled in the art, however, that other suitable adhesives may be found which provide the combination of adhesive bonding and sealing characteristics required for adhesive seal bead 19 in practicing the present invention. Returning to FIG. 1 and in accordance with the present invention, the adhesive seal forming adhesive seal bead 19 exhibits a characteristic cure time as the chemical reaction with the epoxy adhesive takes place to provide complete "hardening" or curing of the adhesive material. Accordingly and in accordance with the present invention, seal ring 10 having an applied adhesive seal bead in the manner shown in FIG. 2 is positioned above filler neck 35 and aligned with filler passage 37 such that filler neck extension 13 is aligned with inner wall 29 of filler neck 35. Thereafter, seal ring 10 is positioned upon raised ring 36 such that adhesive seal bead 19 is forced against the underlying portion of interior wall 29 and gasket seat 38 of filler neck 35. Once seal ring 10 is thus positioned, gas cap 40 is immediately inserted into filler neck 35 and rotated to engage threaded cylindrical portion 44 with threads 39 of filler neck 35 drawing gas cap 40 into the filler neck. The insertion of gas cap 40 into filler neck 35 operates to center seal ring 10 with respect to gas cap 40 and filler neck 35. As gas cap 40 is tightened, resilient seal gasket 45 (seen in FIG. 3) is drawn against gasket seat 18 of seal ring 10 forcing fuel neck extension 13 into filler neck 35 and compressing adhesive seal bead 19 (seen in FIG. 3) against gasket seat 38 and interior wall 29 of filler neck 35. Once gas cap 40 is tightened to the desired degree, the resilience of gasket seal 45 maintains a continuous pressure against seal ring 10 to maintain seal ring position and to exert a positive pressure against adhesive seal bead 19 as it cures. Thereafter, gas cap 40 is maintained in the inserted position until adhesive seal bead 19 completes its cure time. Thereafter, gasket cap 40 may be removed leaving seal ring 10 securely attached to filler neck 35 in a sealed attachment in which fuel neck extension 13 is sealed to interior wall 29 and gasket seat 38 to provide complete sealing enclosure of the upper portion of filler neck 35 between seal ring 10 and the filler neck. Once positioned, seal ring 10 covers raised ring 36 and the portion of upper surface 34 encircling filler neck 35 from further damage or deterioration as fuel tank 30 is filled with the insertion of a fuel nozzle into filler neck 35.

FIG. 2 sets forth an inverted perspective view of seal ring 10 showing the attachment of adhesive seal bead 19 thereto. As described above, seal ring 10 defines an annular body 11 having an outer edge 15, a filler neck extension 13 having a lower edge 14 and a raised portion 16 together with an angled portion 17. In accordance with the present invention, adhesive seal bead 19 is positioned on the undersurface of raised portion 16 and gasket seat 18 of seal ring 10. In further accordance with the present invention, adhesive seal bead 19 extends across the interior surface of filler neck extension 13 to provide an effective seal attachment to the underlying portion of interior wall 29 of filler neck 35 (seen in FIG. 1).

FIG. 3 sets forth a section view of seal ring 10 installed within fuel tank 30 and secured by gas cap 40. As described above, fuel tank 30 defines an upper surface 34 and a filler neck 35 extending downwardly into the interior of fuel tank 30. A raised ring 16 encircles filler neck 35 at upper surface 34. Filler neck 35 defines a plurality of internal threads 39 and a generally cylindrical interior wall 29. Filler neck 35 also defines a curved gasket seat 38 extending between raised ring 36 and interior wall 29.

In accordance with the present invention, seal ring 10 is fitted upon fuel tank 30 such that filler neck extension 13 extends downwardly into filler neck 35 and overlies the upper portion of interior wall 29. In further accordance with the present invention, seal ring 10 includes a raised portion 16 extending above raised ring 36 and an angled portion 17 extending downwardly toward upper surface 34 of fuel tank 30 and terminating in an outer edge 15. Seal ring 10 defines a gasket seat 18 extending between raised portion 16 and filler neck extension 13 which essentially covers gasket seat 38 of filler neck 35. In further accordance with the present invention, an adhesive seal bead 19 is formed between gasket seat 38 and the upper portion of interior wall 29 and the underside of seal ring 10 to secure seal ring 10 in the properly centered position described above.

Gas cap 40 includes a circular knob 40 having an outer grip 42 and an undersurface 43 together with a cylindrical threaded portion 44 extending downwardly from undersurface 13. An annular resilient seal gasket 45 is received upon threaded cylindrical portion 44 of gas cap 40 and is positioned against undersurface 43. Thus, as gas cap 40 is threadably received within filler neck 35 in the manner shown in FIG. 3, seal gasket 45 is compressed against gasket seat 18 of seal ring 10 to force adhesive seal bead 19 against gasket seat 38 and interior wall 29 of filler neck 35. Once adhesive seal bead 19 has cured, seal ring 10 is permanently affixed to filler neck 35 and provides the above-described protective covering for raised portion 16 and the surrounding area of upper surface 34 of fuel tank 30. In addition, the downward extension of filler neck extension 13 into filler neck 35 together with seal bead 19 provides complete sealing between seal ring 10 and filler neck 35 protecting against undesired leakage therebetween.

FIG. 4 sets forth an enlarged partial section view showing the attachment of seal ring 10 to filler neck 35. As described above, fuel tank 30 defines a raised ring 36, a gasket seat 38 and a filler neck 35 having threads 39 formed therein. Filler neck 35 defines an interior wall 29. As is also described above, seal ring 10 includes an annular body 11 having an outer edge 15, a raised portion 16, an angular portion 17 and a downwardly extending filler neck extension 13. Seal ring 10 further defines a curved gasket seat 18. Adhesive seal bead 19 is shown distributed between gasket seat 38 and the underlying portion of interior wall 29 of filler neck 35 and the overlying surface of seal ring 10. It is important to note that the extension of filler neck extension 13 downwardly into filler neck 35 provides an effective seal and protects adhesive seal bead 19 thereby maintaining the secure attachment of seal ring 10.

What has been shown is a protective seal ring for motorcycle fuel filler neck in which an annular preferably stainless steel protective seal ring is securable the upper portion of the motorcycle fuel tank filler neck using an adhesive seal bead attachment. The protective seal ring includes a raised portion and angled portion extending outwardly to overlie and protect the raised ring of the motorcycle fuel tank and the encircling portion of the fuel tank upper surface. In addition, the protective seal ring includes a downwardly extending filler neck extension which extends into the motorcycle fuel tank filler neck to complete the protective attachment and prevent damage or leaks in the fueling process.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in combination with a motorcycle fuel tank having an upper surface, a recessed threaded filler neck, a gasket seat, a raised ring surrounding the filler neck encircled by an upper tank surface, a gasket seat and a gas cap having a seal gasket receivable upon the gasket seat formed in the filler neck and a threaded cylinder stem receivable within the recessed threaded filler neck, a protective seal ring comprising:

an annular body defining a center aperture defining a diameter greater than the diameter of the threaded cylinder stem, a downwardly extending filler neck extension receivable into the motorcycle fuel tank filler neck, a curved gasket seat extending upwardly from said filler neck extension and a raised portion extending outwardly from said gasket seat and protectively covering said raised ring of said motorcycle fuel tank and the surrounding upper tank surface proximate the raised ring; and an adhesive seal bead interposed between the gasket seat of a motorcycle filler neck and said filler neck extension, said annular body being positioned within the motorcycle filler neck by inserting the threaded cylinder stem of the motorcycle gas cap through said center aperture and filler neck extension of said annular body into the recessed threaded filler neck to threadably couple the gas cap to the filler and captivate said annular body therebetween forcing the gas cap seal gasket against said curved gasket seat.

2. A protective seal ring as set forth in claim 1 wherein said adhesive seal bead extends between said filler neck extension and a portion of the motorcycle fuel tank filler neck.

3. A protective seal ring as set forth in claim 2 wherein said annular body further defines an angled portion extending outwardly and downwardly from said raised portion.

4. A protective seal ring as set forth in claim 3 wherein said annular body is formed of stainless steel.

5. A protective seal ring for attachment to a threaded recessed motorcycle fuel filler neck of a motorcycle fuel tank having an upper surface having a lower threaded portion and a threaded gas cap received within the threaded recess, said protective seal ring comprising:

a cylindrical neck extension defining a center aperture sufficient in diameter to pass said gas cap therethrough, receivable into a motorcycle fuel filler neck, terminating in a lower edge within the filler neck interior above said lower threaded portion of said fuel filler neck;

a curved gasket seat extending upwardly from said cylindrical neck extension and curving upwardly and outwardly therefrom to form a curved annular surface;

a generally planar annular portion extending outwardly from said curved gasket seat beyond said fuel filler neck;

a downwardly angled curved annular portion extending outwardly from said generally planar angular portion and terminating in an outer edge, said outer edge being above said lower edge of said neck extension; said planar annular portion and said curved annular portion protectively covering the surrounding upper tank surface; and an adhesive seal bead formed upon said undersurface of said protective seal ring proximate said gasket seat and said neck extension whereby said protective seal ring is captivated between the fuel filler neck and the gas cap without interfering with the threaded engagement of the gas cap within the fuel filler neck.

6. A method for protecting the filler neck and surrounding upper surface of a motorcycle fuel tank having a raised ring, a filler neck interior wall defining threads, a gasket seat between the interior wall and raised ring and having a gas cap threadably receivable within the filler neck and having a resilient gasket supported thereon, said method comprising the steps of:

providing a protective seal ring defining a center aperture sufficient to pass the gas cap and having a neck extension, a curved gasket seat and a raised portion extending outwardly from said curved gasket seat;

removing said gas cap to expose said filler neck;

forming a bead of adhesive seal material upon said seal ring proximate said curved gasket seat and neck extension using an adhesive material having a cure period;

positioning said seal ring upon said filler neck such that said neck extension extends into said filler neck overlying a portion of said interior wall and such that said curved gasket seat of said seal ring overlies the motorcycle fuel tank gasket seat and said raised portion overlies the raised ring of the motorcycle fuel tank filler neck and a portion of the surrounding upper tank surface;

pressing said seal ring against the filler neck to force said bead of adhesive seal material against the sidewall and gasket seat of the motorcycle fuel tank filler neck;

installing the gas cap through said center aperture and into the filler neck for threaded coupling thereto and tightening the gas cap therein to captivate said seal ring between the filler neck and the gas cap and compress the resilient gasket against said gasket seat to center said seal ring within said filler neck and compress said bead of adhesive seal material;

waiting through said cure period using the captivation of said seal ring to maintain the centering of said seal ring; and removing the gas cap leaving said seal ring centered within and attached to the filler neck.

* * * * *